US006796603B2

United States Patent
Pringnitz

(10) Patent No.: US 6,796,603 B2
(45) Date of Patent: Sep. 28, 2004

(54) ADJUSTABLE DOOR LATCH

(75) Inventor: Todd A. Pringnitz, Spring Lake, MI (US)

(73) Assignee: Fleet Engineers Incorporated, Muskegon, MI (US)

( * ) Notice: Subject to any disclaimer, the term of this patent is extended or adjusted under 35 U.S.C. 154(b) by 0 days.

(21) Appl. No.: 10/604,477

(22) Filed: Jul. 24, 2003

(65) Prior Publication Data

US 2004/0108742 A1 Jun. 10, 2004

Related U.S. Application Data

(60) Provisional application No. 60/319,457, filed on Aug. 9, 2002.

(51) Int. Cl.$^7$ ............................. B60J 5/10; E05C 3/02; E05C 3/04
(52) U.S. Cl. ............................. 296/186.3; 296/146.8; 292/240; 292/241
(58) Field of Search ............................. 296/186.3, 146.8, 296/146.13, 152, 56; 292/240, 241, 108, 113, 114, DIG. 32, DIG. 60

(56) References Cited

U.S. PATENT DOCUMENTS

| | | | | |
|---|---|---|---|---|
| 3,622,189 A | * | 11/1971 | Rosehitz et al. | ............ 292/240 |
| 3,642,314 A | * | 2/1972 | Smith et al. | ................. 292/134 |
| 3,802,726 A | * | 4/1974 | Galbreath et al. | ........... 292/100 |
| 3,893,722 A | * | 7/1975 | Galbreath et al. | ........... 292/100 |
| 4,116,479 A | | 9/1978 | Poe | |
| 4,483,557 A | | 11/1984 | Pastva | |
| 5,063,764 A | * | 11/1991 | Amis et al. | .................... 70/100 |
| 5,692,788 A | | 12/1997 | Costa | |
| 6,092,404 A | * | 7/2000 | Chhatwal | .................... 70/278.1 |
| 6,139,074 A | * | 10/2000 | Barnett et al. | ............... 292/240 |
| 6,299,224 B1 | * | 10/2001 | Finkelstein | .................. 292/241 |

\* cited by examiner

Primary Examiner—D. Glenn Dayoan
Assistant Examiner—G Blankenship
(74) Attorney, Agent, or Firm—McGarry Bair PC

(57) ABSTRACT

A cam-type door latch assembly comprises a handle and an arm assembly terminating in a finger-like cam and pivotal to bring the cam into engagement with a conventional locking pin assembly. The arm assembly is selectively adjustable for lengthening or shortening the arm assembly, thereby adjusting the contact force between the cam and the locking pin and, consequently, the door closing force. The arm assembly comprises a sleeve enclosing a wedge nut and a cam arm having offsetting inclined faces which are tightened against each other with a threaded connector to lock the wedge nut and cam arm in position in the sleeve when the cam has been properly adjusted relative to the locking pin.

32 Claims, 5 Drawing Sheets

ADJUSTABLE DOOR LATCH

CROSS REFERENCE TO RELATED APPLICATIONS

This application claims the benefit of U.S. provisional application Ser. No. 60/319,457, filed Aug. 9, 2002, which is incorporated herein in its entirety.

BACKGROUND OF INVENTION

1. Field of the Invention

The invention relates generally to latches for rollup-type truck cargo doors. In one aspect, the invention relates to a cam-type door latch having an adjustable latch assembly to adjust the closing force of the door.

2. Description of the Related Art

Trailers for semi-tractors and delivery trucks have long used roll-up doors to control access through a rear opening of the truck or trailer. The doors are typically provided with a resilient gasket along the lower edge to provide a seal between the door and adjacent frame when the door is closed. The doors are typically secured in the closed position through a latch assembly which is mounted adjacent the lower edge of the door. One such latch assembly is known in the industry as a "cam lock." The cam lock typically comprises a pivoting handle attached to a latch arm having a curved finger-like cam extending transverse to the arm. The cam is positioned snuggly beneath a cam retainer mounted in a catch box or latch plate mounted in the frame. Pivoting the handle downward rotates the cam into engagement with the pin, securing the door in the closed position with a downwardly-exerted force sealing the gasket against the frame. Pivoting the handle upward disengages the cam from the pin so that the door can be opened.

Over time, the gasket can wear and lose its resiliency, or the door-mounting hardware can become loosened, so that the cam lock is unable to exert sufficient force against the pin to satisfactorily draw the door downward against the frame. Various methods have been proposed for addressing this problem. Replacement of the gasket and/or adjustment of the door can correct the problem but can be time-consuming and costly. Repositioning of the cam lock on the door can also be done, but this may require a costly modification to the door. Furthermore, where the cam lock should be repositioned in order to provide the desired seal may not be immediately evident, necessitating several repositioning attempts.

Adjustable latches have also been developed. For example, U.S. Pat. No. 5,692,788 to Costa, issued Dec. 2, 1997, discloses a catch box with an adjustable locking pin for a cam-type door latch assembly. The locking pin is housed in a frame-mounted catch box into which the cam is received. The locking pin comprises a vertically-adjustable strike pin which can be adjusted upwardly or downwardly by turning a threaded post while the cam engages the strike pin, thereby ensuring the desired degree of sealing force between the door and the frame. However, the catch box is susceptible to the accumulation of dirt and debris which can interfere with the turning of the post and the movement of the strike pin, thereby limiting the adjustability of the locking pin.

SUMMARY OF INVENTION

A truck has a support bed at a rear portion thereof, and a rear enclosure mounted to the support bed and defined in part by sidewalls and a top wall. A door opening is at a rear portion of the enclosure and is defined by a door frame and the support bed. Vertical tracks are mounted in the door frame adjacent to the opening, and a door is mounted in the vertical tracks for vertical movement between a closed position and an open position. A latch is pivotally mounted near the bottom of the door for movement between a latched position and an unlatched position and has a handle, a cam arm, and a cam. An opening is in the support bed beneath the door opening and is adapted to receive the cam when the handle is rotated from an unlatched position to a latched position. A cam retainer is mounted in the support bed and is adapted to engage the cam and draw the door against the support bed when the handle is rotated from an unlatched position to a latched position. According to the invention, the cam arm is longitudinally adjustable to adjust the length of the cam arm and thus adjust the force of the door against the support bed.

According to another embodiment of the invention, the cam arm comprises a sleeve having a channelway therethrough and a shaft adapted for slidable register with the channelway. According to another embodiment, the invention further comprises a wedge nut adapted for slidable translation relative to the shaft. The wedge nut can be wedge shaped, and can have ribs to grip the channelway. According to another embodiment, the shaft and the channelway can have a wedge-shaped cross-section. According to another embodiment, the sleeve can have a lock screw to lock the shaft to the sleeve. The shaft can have notches to indicate its position relative to the sleeve.

According to another embodiment of the invention, a door is adapted to be mounted in tracks in a door opening for vertical movement between a closed position and an open position. A latch is pivotally mounted near the bottom of the door for movement between a latched position and an unlatched position and has a handle, a cam arm, and a cam. The cam is adapted to engage a cam retainer mounted in an opening in a support bed beneath the door opening to draw the door against the support bed when the handle is rotated from an unlatched position to a latched position. The cam arm is longitudinally adjustable to adjust the length of the cam arm and thus adjust the force of the door against the support bed.

According to yet another embodiment, a latch is adapted to be pivotally mounted near the bottom of a door for movement between a latched position and an unlatched position and having a handle, a cam arm, and a cam. The cam is adapted to engage a cam retainer mounted in an opening in a support bed beneath the door to draw the door against the support bed when the handle is rotated from an unlatched position to a latched position. The cam arm is longitudinally adjustable to adjust the length of the cam arm and thus adjust the force of the door against the support bed.

DETAILED DESCRIPTION

A cam-type latch assembly for a roll-up truck cargo door has a cam attached to an adjustable cam arm for selectively adjusting the engaging force between the cam and a cam retainer, thereby ensuring tight closure of the door.

Figure 1:
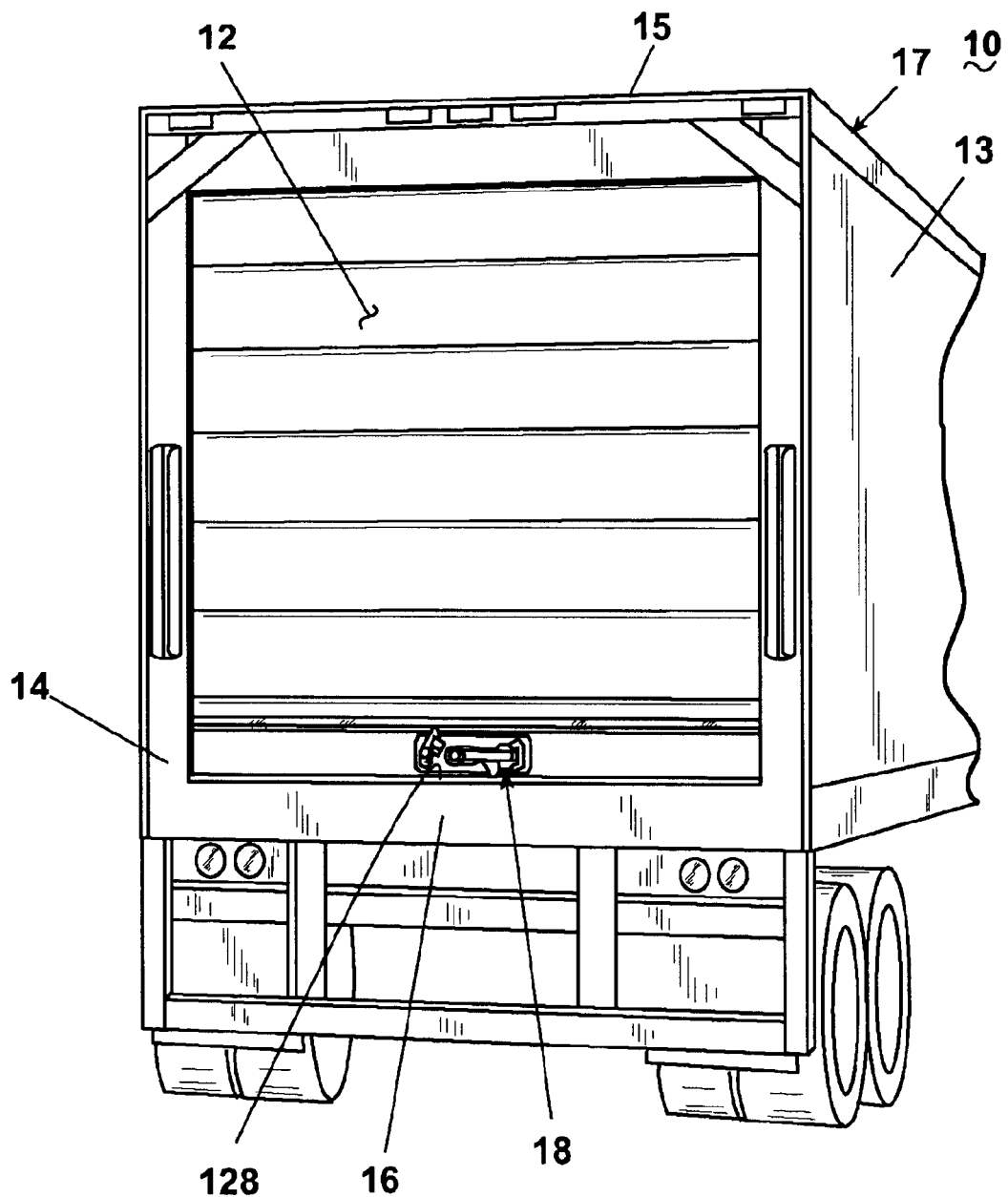
FIG. 1 is a perspective view of the rear of a conventional truck trailer having a cam-type door latch assembly according to the invention.

Referring to the drawings and to FIG. 1 in particular, a semi-truck trailer 10 is shown having a generally conventional rear roll-up cargo door 12 mounted in a frame 14 defining a door opening. The trailer 10 comprises a well-known support bed 16 for supporting cargo thereon, and an enclosure 17 comprising side walls 13 and a top wall 15 mounted to the support bed 16. The frame 14 is mounted to the support bed 16, the side walls 13, and the top wall 15 in a well-known manner, and comprises a pair of well-known parallel, spaced-apart vertical tracks (not shown) attached to the frame 14 on either side of the door opening and adapted to support the door 12 for movement of the door 12 between an open position and a closed position. It will be apparent to a person of ordinary skill in the industry that such a door assembly can also be utilized in other vehicles having an enclosed cargo space supported on a support bed.

Figure 3:
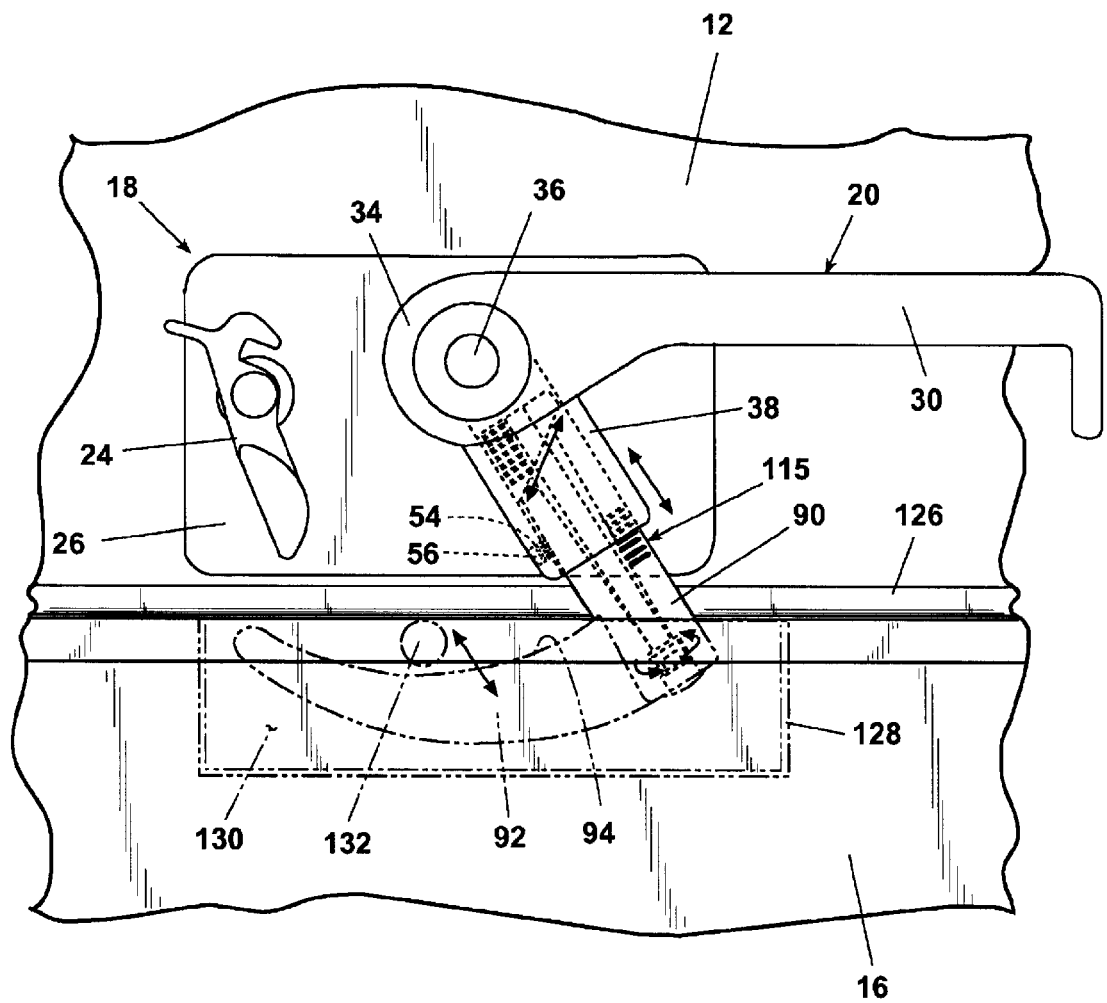
FIG. 3 is an enlarged elevational view of the cam-type door latch assembly of FIG. 1 and a catch box mounted in a support bed of the trailer shown in phantom lines and illustrating the adjustable engagement of the cam with a cam retainer mounted in the catch box.

The lower edge of the door 12 is provided with a conventional resilient gasket 126 for sealing the door 12 against the support bed 16 (FIG. 3). The support bed 16 houses a well-known catch box 128, as shown in greater detail in FIG. 3. The catch box 128 comprises a box-like structure set into the support bed 16, having a chamber 130 and a transversely-mounted cam retainer 132 which operably communicates with an adjustable cam-type door latch assembly 18 according to the invention.

Figure 2:
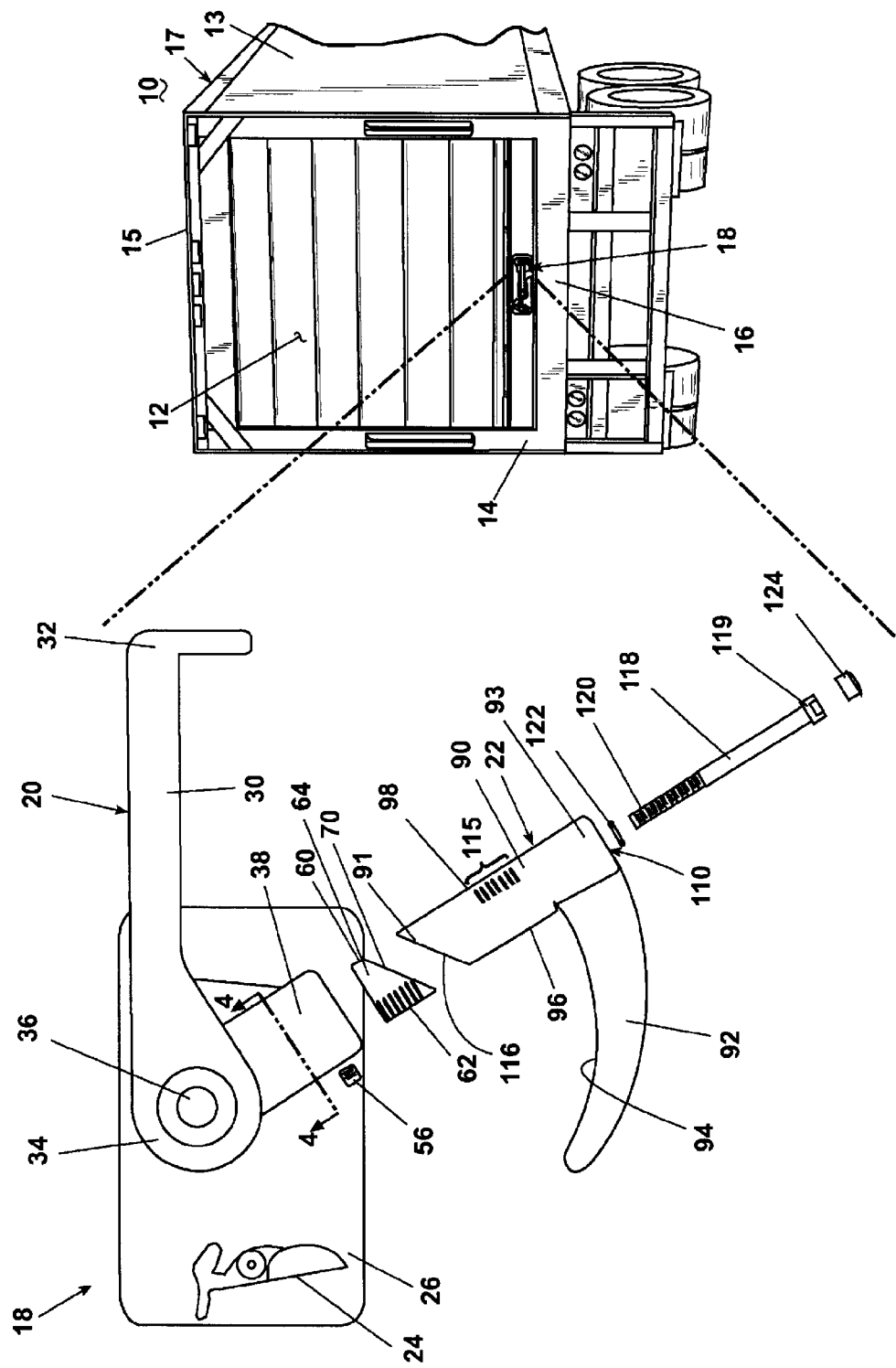
FIG. 2 is an exploded view of the cam-type door latch assembly shown in FIG. 1.

Referring now to FIG. 2, a preferred embodiment of the door latch assembly 18 has a generally conventional configuration comprising a handle assembly 20 and an attached cam arm assembly 22 pivotally mounted to a mounting plate 26 through a conventional pivot assembly 36. The handle assembly 20 comprises a handle 30 having a generally conventional locking end 32 and a pivot end 34 comprising the pivot assembly 36. The handle assembly 20 is adapted to pivot about the pivot assembly 36 to selectively rotate the door latch assembly 18 into a locked or unlocked position. When the door latch assembly 18 is in the locked position, the handle 30 will be in a generally horizontal orientation. The handle 30 is rotated counterclockwise to bring the door latch assembly 18 into an unlocked configuration. A well-known locking pawl assembly 24 is also pivotally mounted to the mounting plate 26.

Figure 4:
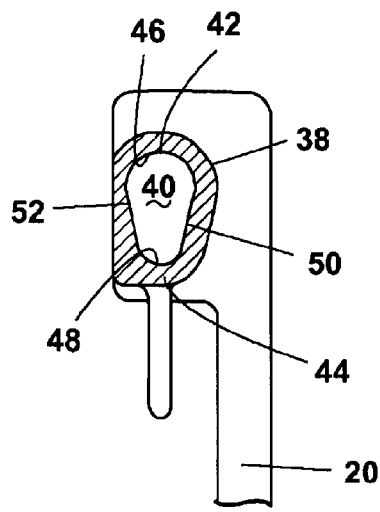
FIG. 4 is a sectional view of a sleeve comprising a portion of an adjustable arm assembly of the door latch assembly shown in FIGS. 2 and 3 and taken along line 4—4 of FIG. 2.

Extending downwardly from the pivot assembly 36 at an angle to the handle 30 is the cam arm assembly 22 comprising a sleeve 38. As shown in FIG. 4, the sleeve 38 is a hollow, elongated body comprising a major arcuate wall 42 and a minor arcuate wall 44 in spaced-apart juxtaposition connected by a first sidewall 50 and a second sidewall 52 in spaced-apart juxtaposition to define a channelway 40 having a somewhat rounded wedge shape. The inner portion of the major arcuate wall 42 forms a major arcuate surface 46. The inner portion of the minor arcuate wall 44 forms a minor arcuate surface 48. A threaded setscrew bore 54 extends laterally through the major arcuate wall 42 into the channelway 40 for threadably receiving a conventional setscrew 56.

Figure 8:
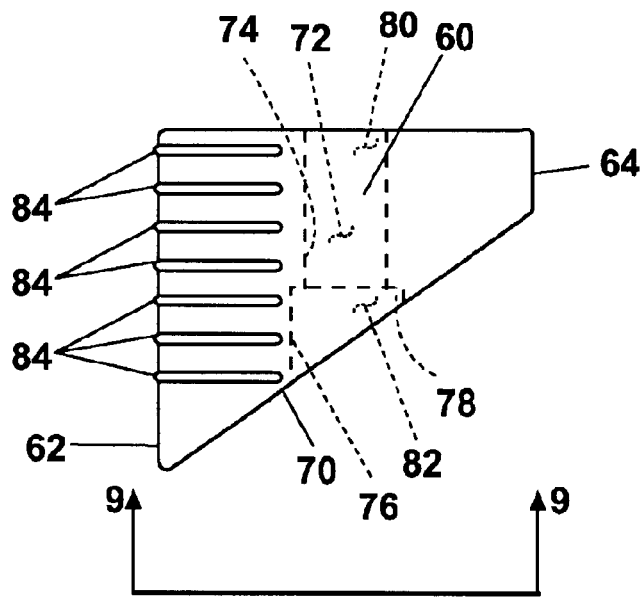
FIG. 8 is a side view of a wedge nut comprising a portion of an adjustable arm assembly of the door latch assembly shown in FIG. 2.
Figure 9:
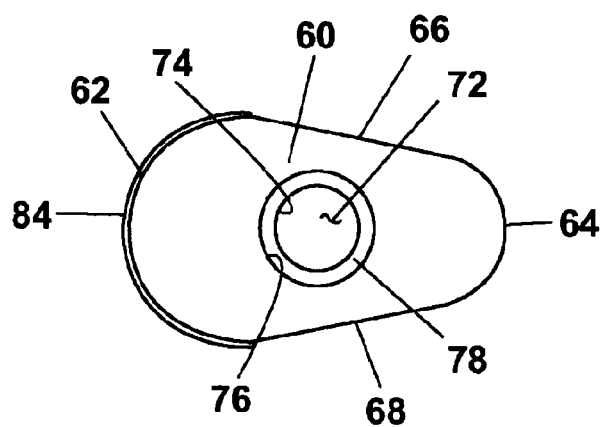
FIG. 9 is a plan view from underneath of the wedge nut shown in FIG. 8 taken along lines 9—9 of FIG. 8.

Referring again to FIG. 2, the cam arm assembly 22 also comprises a wedge nut 60 and a cam arm 90 terminating in a cam 92 extending laterally from the cam arm 90. Referring to FIGS. 8 and 9, the wedge nut 60 comprises a generally rounded wedge-shaped body having a major curved face 62 and a minor curved face 64 in spaced-apart juxtaposition connected by a first flat face 66 and a second flat face 68 in spaced-apart juxtaposition, and adapted for slidable register with the channelway 40. The major curved face 62 is provided with a plurality of parallel, spaced-apart raised ribs 84.

Extending through the wedge nut 60 intermediate the major curved face 62 and the minor curved face 64 is an aperture 72 having a generally cylindrical narrow aperture wall 74 transitioning through an annular shoulder 78 to a generally cylindrical wide aperture wall 76 to form a narrow aperture 80 coaxial with a wide aperture 82. The narrow aperture 80 is threaded. The wedge nut 60 also comprises an inclined face 70 transverse to the flat faces 66, 68. The wedge nut 60 is slidably received in the channelway 40 with the minor curved face 64 in slidable communication with the minor arcuate wall 44, the first flat face 66 in slidable communication with the first sidewall 50, the second flat face 68 in slidable communication with the second sidewall 52, and the ribs 84 in slidable communication with the major arcuate wall 42.

Figure 6:
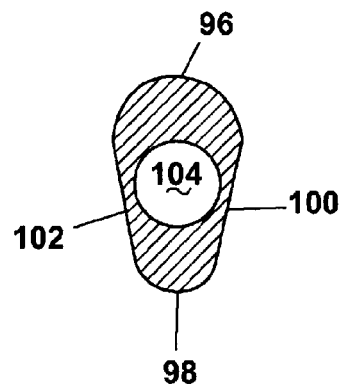
FIG. 6 is a sectional view of a portion of the adjustable arm assembly shown in FIG. 5 taken along line 6—6 of FIG. 5.
Figure 5:
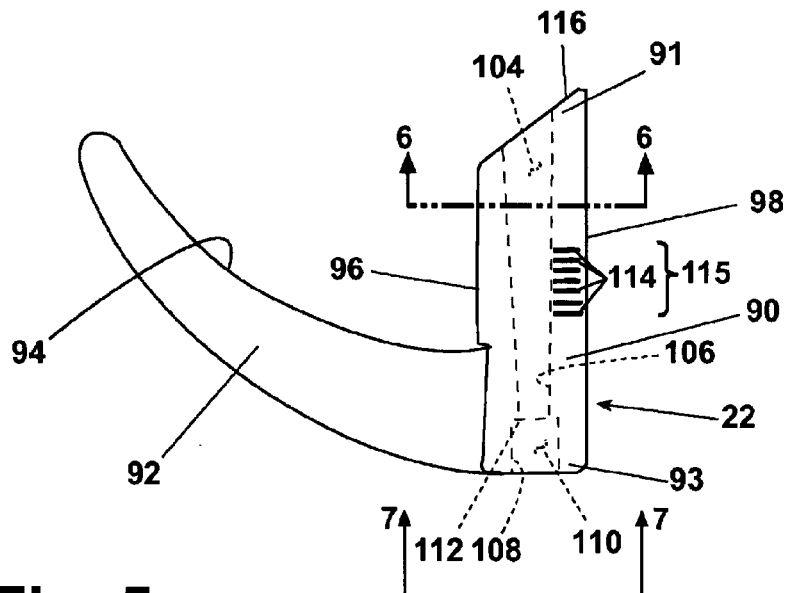
FIG. 5 is a side view of a portion of the adjustable arm assembly of the door latch assembly shown in FIG. 2.
Figure 7:
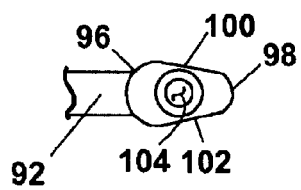
FIG. 7 is a plan view from underneath of a portion of the adjustable arm assembly taken along lines 7—7 of FIG. 5.

Referring to FIGS. 5—7, the cam arm 90 is an elongated shaft having a first end 91 and a second end 93 and a generally rounded wedge-shaped cross section comprising a major curved face 96 and a minor curved face 98 in spaced-apart juxtaposition connected by a first flat face 100 and a second flat face 102 in spaced-apart juxtaposition. Preferably, the cross-sectional configuration of the cam arm 90 is the same as the cross-sectional configuration of the wedge nut 60. A bolt head aperture 110 extends coaxially into the cam arm 90 at the second end 93. A tapered bolt aperture 104 tapering expansively from the bolt head aperture 110 to the first end 91 extends through the cam arm 90 coaxially with the bolt head aperture 110. The diameter of the bolt head aperture 110 is somewhat greater than the diameter of the adjoining end of the tapered bolt aperture 104 so that an annular shoulder 112 is formed at the transition from the bolt head aperture 110 to the tapered bolt aperture 104. The minor curved face 98 is provided with a plurality of parallel, evenly spaced-apart notches 114 to form a linear scale 115. The cam arm 90 is slidably received in the channelway 40 with the major curved face 96 in slidable communication with the major arcuate wall 42, the minor curved face 98 in slidable communication with the minor arcuate wall 44, the first flat face 100 in slidable communication with the first sidewall 50, and the second flat face 102 in slidable communication with the second sidewall 52.

Extending laterally from the second end 93 is a generally conventional finger-like arcuate cam 92 having an upper arcuate surface 94. As shown in FIG. 3, the arcuate surface 94 engages the cam retainer 132 mounted in the catch box 128 in a generally conventional manner to secure the trailer door 12 in a closed position against the support bed 16. The first end 91 terminates in an inclined face 116 for slidable communication with the inclined face 70 of the wedge nut 60.

A threaded fastener 118, preferably a bolt, having a bolt head 119 and a threaded portion 120, is inserted through the bolt head aperture 110 and the tapered bolt aperture 104 to be threaded into the threaded narrow aperture 80 in the wedge nut 60. A washer 122 is adapted to be inserted into the bolt head aperture 110 for insertion of the bolt 118 therethrough to serve as a bearing surface for the bolt head 119 during rotation of the bolt 118. Referring again to FIG. 2, the bolt 118 is inserted through the bolt head aperture 110, the washer 122, and the tapered bolt aperture 104 so that the head 119 bears against the washer 122 which is seated against the annular shoulder 112 (FIG. 5). The threaded portion 120 is threaded into the wedge nut 60 to form the cam arm assembly 22 so that the inclined face 70 of the wedge nut 60 is in slidable communication with the inclined face 116 of the cam arm 90. A cap 124, preferably fabricated of a resilient material such as a plastic, can be inserted over the bolt head 119 and frictionally retained in the bolt head aperture 110 to protect the bolt head 119 and the bolt head aperture 110 against impact and dirt.

The cam arm assembly 22 is adjusted by loosening the setscrew 56 and the bolt 118 so that the cam arm assembly 22 can be slidably moved within the sleeve 38. The position of the cam arm assembly 22 in the sleeve 38 is manually adjusted, preferably with reference to the scale 115, to provide the desired contact force between the arcuate surface 94 and the cam retainer 132. As shown in FIG. 3, as the bolt 118 is turned in a tightening, i.e. clockwise, direction, the wedge nut 60 will be drawn against the cam arm 90. Because of the inclined faces 70, 116, the wedge nut 60 will translate laterally relative to the cam arm 90. The tapered bolt aperture 104 will accommodate the lateral movement of the bolt 118 as the wedge nut 60 moves laterally. With the cam arm assembly 22 inserted into the channelway 40 in the sleeve 38, lateral translation of the wedge nut 60 will urge the ribs 84 into frictional contact with the major arcuate surface 46 and the minor curved face 98 into frictional contact with the minor arcuate surface 48, which will tend to "lock" the cam arm assembly 22 into the sleeve 38. The desired degree of insertion of the cam arm assembly 22 into the sleeve 38 is assisted by reference to the scale 115. The setscrew 56 can then be threaded against the cam arm assembly 22 to further lock the cam arm assembly 22 in position.

Referring again to FIG. 3, adjustment of the adjustable door latch assembly 18 is expected to typically involve shortening the cam arm to bring the arcuate surface 94 into snug contact with the cam retainer 132. This function is accomplished by loosening the setscrew 56 and the bolt 118 so that the cam arm assembly 22 can be slidably adjusted further into the sleeve 38. It will be apparent from FIG. 3 that this function is accomplished with the door latch assembly 18 disengaged from the cam retainer 132 in order to provide access to the bolt 118. However, the scale 115 can be used to guide incremental changes in the insertion of the cam arm assembly 22 into the sleeve 38 until the proper contact force between the arcuate surface 94 and the cam retainer 132 is achieved. The cam arm assembly 22 is then locked into the sleeve 38 by suitable tightening of the bolt 118 and tightening of the setscrew 56. Over time, as the trailer door 12 again becomes loosened, the adjustment procedure can be repeated to maintain the proper door closure force between the door 12 and the support bed 16.

The novel adjustable door latch assembly 18 provides a simple and effective means of maintaining the proper closure force for a trailer door. The clamping force between the arcuate surface 94 and the cam retainer 132 can be readily adjusted by manually adjusting the length of the cam arm, guided by the scale 115, followed by retightening of the setscrew 56 and the bolt 118. Adjustment of the door closure force through repositioning of the entire door latch assembly on the door is eliminated. Furthermore, the adjustment mechanism described herein is not exposed to the accumulation of dirt and debris which could adversely affect the operation of the adjustment mechanism as is an adjustable cam retainer or other catch box adjustment mechanism. The simplicity of operation of the adjustment mechanism enables the iterative adjustment of the contact force between the arcuate surface 94 and the cam retainer 132 relatively quickly.

While the invention has been specifically described in connection with certain specific embodiments thereof, it is to be understood that this is by way of illustration and not of limitation. Reasonable variation and modification are possible within the scope of the foregoing description and drawings without departing from the spirit of the invention.

What is claimed is:

1. In a truck having a support bed at a rear portion thereof and a rear enclosure mounted to the support bed and defined in part by sidewalls and a top wall; a door opening at a rear portion of the enclosure and defined by a door frame and the support bed; vertical tracks mounted in the door frame adjacent to the opening; a door mounted in the vertical tracks for vertical movement between a closed position and an open position; a latch pivotally mounted near the bottom of the door for movement between a latched position and an unlatched position and having a handle, a cam arm, and a cam; an opening in the support bed beneath the door opening and adapted to receive the cam when the handle is rotated from an unlatched position to a latched position; a cam retainer mounted in the support bed and adapted to engage the cam and draw the door against the support bed when the handle is rotated from an unlatched position to a latched position;

the improvement wherein the cam arm is longitudinally adjustable to adjust the length of the cam arm and thus adjust the force of the door against the support bed.

2. The truck of claim 1 wherein the cam is arcuate.

3. The truck of claim 1 wherein the cam arm comprises a sleeve having a channelway therethrough and a shaft adapted for slidable register with the channelway.

4. The truck of claim 3 and further comprising a wedge nut adapted for slidable translation relative to the shaft.

5. The truck of claim 4 wherein the wedge nut is wedge shaped.

6. The truck of claim 4 wherein the wedge nut has ribs to grip the channelway.

7. The truck of claim 3 wherein the shaft has a wedge-shaped cross-section.

8. The truck of claim 3 wherein the channelway has a wedge-shaped cross-section.

9. The truck of claim 3 wherein the sleeve has a lock screw to lock the shaft to the sleeve.

10. The truck of claim 3 wherein the shaft has notches to indicate its position relative to the sleeve.

11. The truck of claim 1 wherein the door is a roll-up door.

12. In a door adapted to be mounted in tracks in a door opening for vertical movement between a closed position and an open position; a latch pivotally mounted near the bottom of the door for movement between a latched position and an unlatched position and having a handle, a cam arm, and a cam; the cam being adapted to engage a cam retainer mounted in an opening in a support bed beneath the door opening to draw the door against the support bed when the handle is rotated from an unlatched position to a latched position;

the improvement wherein the cam arm is longitudinally adjustable to adjust the length of the cam arm and thus adjust the force of the door against the support bed.

13. The door of claim 12 wherein the cam is arcuate.

14. The door of claim 12 wherein the cam arm comprises a sleeve having a channelway therethrough and a shaft adapted for slidable register with the channelway.

15. The door of claim 14 and further comprising a wedge nut adapted for slidable translation relative to the shaft.

16. The door of claim 15 wherein the wedge nut is wedge shaped.

17. The door of claim 15 wherein the wedge nut has ribs to grip the channelway.

18. The door of claim 14 wherein the shaft has a wedge-shaped cross-section.

19. The door of claim 14 wherein the channelway has a wedge-shaped cross-section.

20. The door of claim 14 wherein the sleeve has a lock screw to lock the shaft to the sleeve.

21. The door of claim 14 wherein the shaft has notches to indicate its position relative to the sleeve.

22. The door of claim 12 wherein the door is a roll-up door.

23. In a latch adapted to be pivotally mounted near the bottom of a door for movement between a latched position and an unlatched position and having a handle, a cam arm, and a cam; the cam being adapted to engage a cam retainer mounted in an opening in a support bed beneath the door to draw the door against the support bed when the handle is rotated from an unlatched position to a latched position;

the improvement wherein the cam arm is longitudinally adjustable to adjust the length of the cam arm and thus adjust the force of the door against the support bed.

24. The latch of claim 23 wherein the cam is arcuate.

25. The latch of claim 23 wherein the cam arm comprises a sleeve having a channelway therethrough and a shaft adapted for slidable register with the channelway.

26. The latch of claim 25 and further comprising a wedge nut adapted for slidable translation relative to the shaft.

27. The latch of claim 26 wherein the wedge nut is wedge shaped.

28. The latch of claim 26 wherein the wedge nut has ribs to grip the channelway.

29. The latch of claim 25 wherein the shaft has a wedge-shaped cross-section.

30. The latch of claim 25 wherein the channelway has a wedge-shaped cross-section.

31. The latch of claim 25 wherein the sleeve has a lock screw to lock the shaft to the sleeve.

32. The latch of claim 25 wherein the shaft has notches to indicate its position relative to the sleeve.

* * * * *